UNITED STATES PATENT OFFICE.

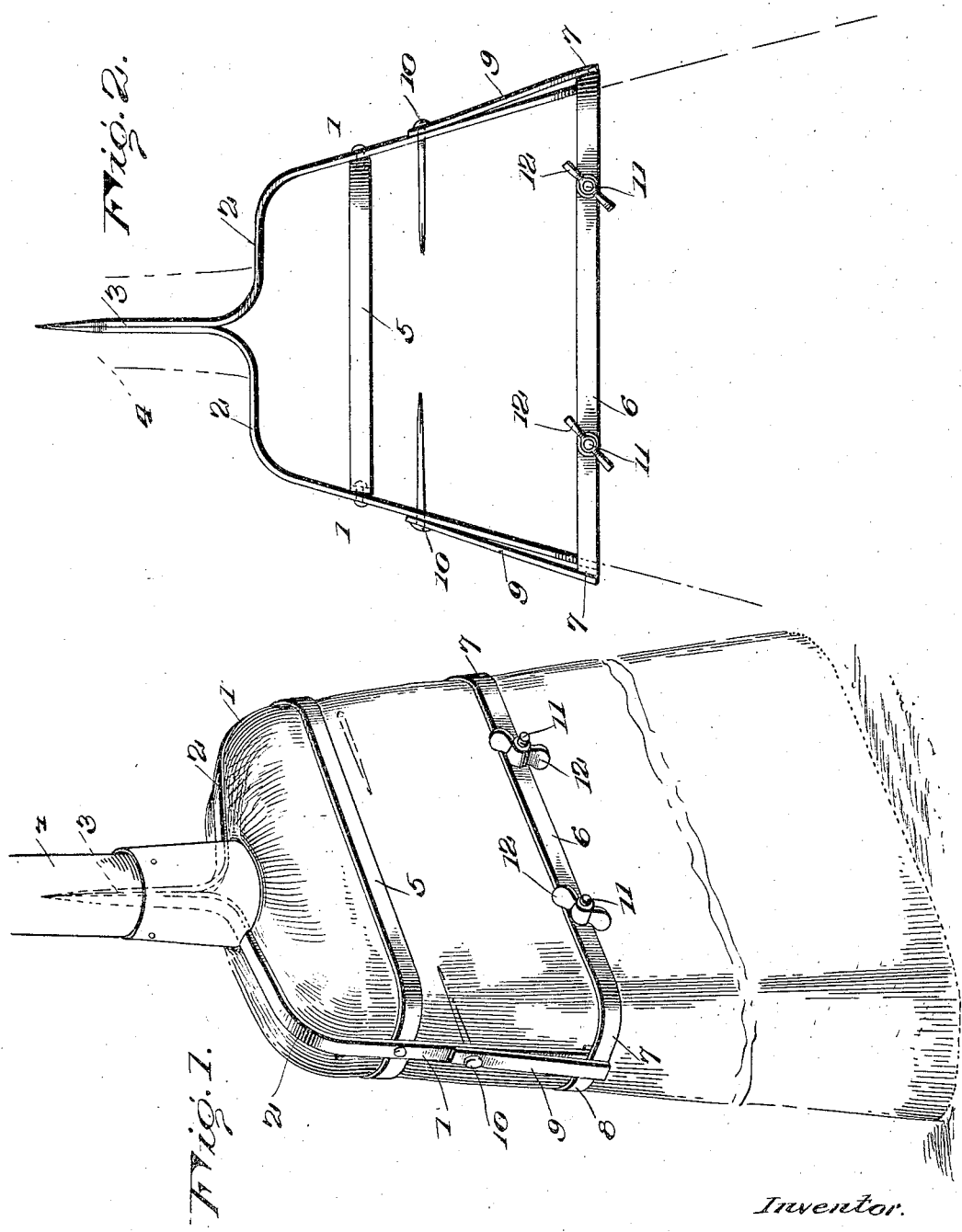

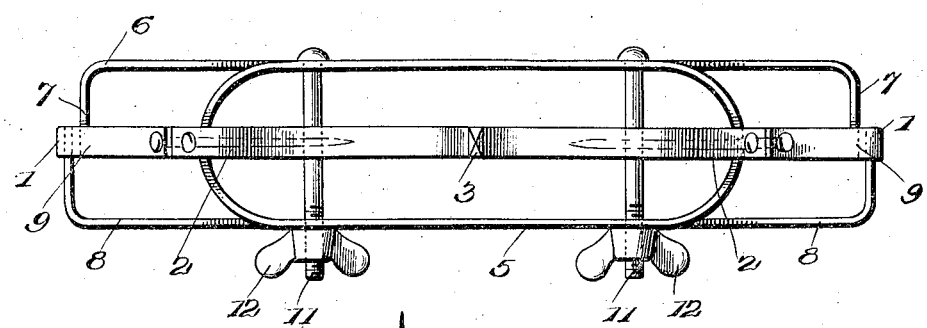
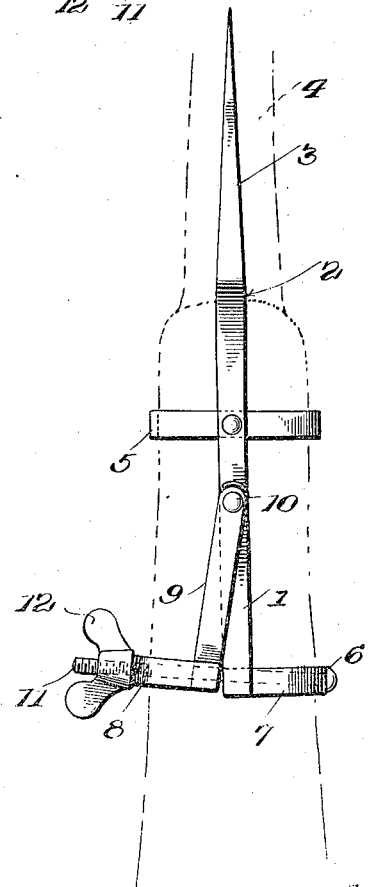

GEORGE GENTSLINGER, OF WAPAKONETA, OHIO.

BROOM-HOLDER.

1,351,638.                    Specification of Letters Patent.    Patented Aug. 31, 1920.

Application filed January 24, 1920. Serial No. 353,711.

*To all whom it may concern:*

Be it known that I, GEORGE GENTSLINGER, a citizen of the United States, residing at Wapakoneta, in the county of Auglaize and State of Ohio, have invented certain new and useful Improvements in Broom-Holders, of which the following is a specification.

The invention relates to an improved broom holder, constructed to embrace a broom head, and held in fixed relation thereto, the holder having an adjustable broom-straw confining means to permit holding the working end of the broom in the most effective condition at all times.

The improved holder comprises a main frame and an adjustable frame, the main frame being fixed with relation to the broom head, while the adjustable frame is pivotally mounted on the main frame, and together with the main frame provides an adjustable broom-straw confining means.

In the drawings:

Figure 1 is a perspective view showing the holder applied.

Fig. 2 is a side elevation of the holder.

Fig. 3 is a plan of the same.

Fig. 4 is a side elevation of the same.

The improved holder comprises a main frame including side bars 1, spaced apart and shaped to overlie and bear against the sides of the broom head. These bars 1 are inwardly turned at the upper portions, as at 2, to bear on the rounded upper portions of the broom head. Beyond the portions 2, the bars 1 are secured together and projected as a pointed stem 3 for insertion in the broom handle 4.

The bars 1, below the portions 2 are provided with a band 5, riveted or otherwise secured in place, which band is arranged to embrace the broom head above the lower end thereof.

The lower or free ends of the bars 1 are provided with a part of what may be termed a confining member, here shown as a metallic strip formed to provide a cross bar 6, and end bars 7 at an angle to the bar 6, with the bars 7 secured to the free ends of the bars 1, This provides a half-ring or band for confining the free ends of the broom straws. The remaining portion of the confining member comprises a half-band 8, similar to that just described, such half-band 8 being carried by bars 9; pivotally to the bars 1, as by pivots 10, here shown as nails which extend into the broom head.

The pivotal support of the adjustable frame, which includes the half-band 8 and bars 9, permits the half-bands to be adjusted relative to each other, preferably by bolts 11 passing through both half-bands and threaded at one end for the reception of adjusting thumb nuts 12. The bolts pass through the broom head, and provide a means whereby the confining means, made up of the two half-bands, may be adjusted, that is increased or decreased in size to properly confine the broom straw near the working end of the broom.

The holder is entirely of metal, and is made up of two parts, which by reason of the pivot nails being driven directly into the material of the broom head, may be readily connected or disconnected.

Claim:

A broom holder comprising metallic straps connected together at one end to form a point, portions of said straps being diverged and projected downwardly to overlie the upper end and opposed edges of a broom, a rigid confining band shaped to fit about the broom and secured to said metallic straps above their lower free ends, a semi-confining band secured to the lower ends of said metallic straps and adapted to embrace one-half the broom, and a supplemental frame including a semi-confining strap to encircle the broom head opposite said semi-confining band and extensions from said semi-confining strap pivotally connected to the metallic straps, and means connecting the semi-confining band and semi-confining strap to vary the clamping coöperation between said parts.

In testimony whereof I affix my signature.

GEORGE GENTSLINGER.